(12) United States Patent
Lu

(10) Patent No.: US 12,419,460 B2
(45) Date of Patent: Sep. 23, 2025

(54) PORTABLE MILK HEATER

(71) Applicant: Naiyun Lu, Guangxi (CN)

(72) Inventor: Naiyun Lu, Guangxi (CN)

( * ) Notice: Subject to any disclaimer, the term of this patent is extended or adjusted under 35 U.S.C. 154(b) by 735 days.

(21) Appl. No.: 17/848,207

(22) Filed: Jun. 23, 2022

(65) Prior Publication Data

US 2023/0414035 A1 Dec. 28, 2023

(51) Int. Cl.
*A47J 36/24* (2006.01)
(52) U.S. Cl.
CPC .................. *A47J 36/2433* (2013.01)
(58) Field of Classification Search
CPC .... A47J 36/2433; A47J 36/2411; A47J 36/24; A47J 36/2483
USPC ....... 219/386, 435, 441, 201, 220, 385, 387, 219/432
See application file for complete search history.

(56) References Cited

U.S. PATENT DOCUMENTS

| | | |
|---|---|---|
| 4,848,216 A | 7/1989 | Robau |
| 5,397,031 A | 3/1995 | Jensen |
| 2021/0007547 A1* | 1/2021 | Moksin .................... A47J 36/32 |
| 2023/0225550 A1* | 7/2023 | Johnson ................ A47J 36/2411 165/80.5 |

OTHER PUBLICATIONS

Liu, CN 112826331 (Year: 2021).*

* cited by examiner

*Primary Examiner* — Vy T Nguyen
(74) *Attorney, Agent, or Firm* — Ying-Ting Chen; Law Office of Michael Chen

(57) ABSTRACT

A portable milk heater may include a milk heater housing, a side cover, a housing of milk holder, a housing of battery holder and a heating plate. The milk heater housing has a cover on the top surface, a switch button on the front side, and a charging socket in the rear side. The cover has a milk holder, and a heating plate is disposed between the milk heater housing and the cover. The portable milk heater can effectively meet the requirements of overall use, timely persevering heat and heating the milk, the overall function is more powerful. At the same time, it can also be used anytime and anywhere, the process of milk heating can be cleaner and more sanitary under sealed environment, so that the overall heating efficiency can be improved, and the rapid operation of milk heating can be completed during the whole process.

8 Claims, 7 Drawing Sheets

PORTABLE MILK HEATER

FIELD OF THE INVENTION

The invention relates to the field of milk heater, in particular to a portable milk heater.

BACKGROUND OF THE INVENTION

Due to the physical fitness of baby is weak, the requirements of temperature of drinking milk and water for baby are higher than usual. The milk heater can conveniently solve this problem, which can keep milk and juice warm and heating them, so that it meets the temperature for baby drinking. The milk heater includes functions of heat preservation and heating, which can also be suitable for the elderly population. Wash the bottle, nipple and other accessories before use to ensure that the milk heater is cleaner, and the effect is more ideal. Put the bottle holder into thermostatic cup horizontally, then put the bottle and nipple into the bottle holder and start heating the milk. During use, add water to the thermostatic cup, place the bottle with breast milk or other food in the bottle holder, and then heat it.

However, the traditional milk heater is not convenient enough to use as a whole and it is necessary to place the milk in the thermostatic cup for heating generally. However, the thermostatic cup has the disadvantage of heat loss and continuous heating cannot be effectively carried out. What's more, it cannot be conveniently carried during use and it cannot effectively heat all the milk outdoor. During the process of use, it cannot effectively meet the overall use needs and it is difficult to timely preserve heat and heating the milk. The overall function is not powerful enough. At the same time, it cannot be effectively used anytime and anywhere. The traditional milk heater is relatively not clean and sanitary as a whole, and the process of sealed heating cannot be effectively carried out. Therefore, the overall heating efficiency is lower, and the rapid operation of heating milk cannot be effectively completed. Therefore, a portable milk heater is required to solve the problems remained in the background art above.

SUMMARY OF THE DISCLOSURE

A portable milk heater may include milk heater housing, side cover, housing of milk holder, housing of battery holder and heating plate. The milk heater housing is provided with the cover of milk heater on the top surface, fixed and connected with switch button in the front side, fixed and connected with charging socket in the rear side, the cover of milk heater is provided with the milk holder, and a heating plate is provided between the milk heater housing and the cover of milk heater. the bottom surface of the heating plate is fixed and connected with battery holder by screws, the inside of the battery holder is fixed and connected with a baseboard and provided with the power supply battery. The top cover is sleeved on the top surface of the side cover, the outer wall of the top cover is provided with the anti-slip grooves, the inner wall of the side cover is provided with an outer thread. The outer wall of the housing of milk holder is provided with the side fixing blocks and the fixing box, the inner wall of the housing of milk holder is provided with inner thread, the bottom surface of the milk holder is provided with the heating plate. The outer wall of the housing of battery holder is provided with the locking screw post, the circuit connection board A and the circuit connection board B on both sides on the top surface, the side of the circuit connecting plate A is fixed and connected with temperature indicator and connection point of switch button, the side of the circuit connecting plate B is fixed and connected with charging socket end, the top surface of the housing of battery holder is provided with screw mounting post, the connection point of switch button is provided with holder cavity.

As a preferred implementation of this invention, the charging socket is electrically connected between the circuit connection board B and the charging socket end through wires, and the switch button is electrically connected between the circuit connection board A, the temperature indicator and the connection point of switch button through wires.

As a preferred implementation of this invention, further comprising two connection point of switch button and circuit connection board A respectively. Besides, the charging socket, charging socket end and circuit connection board B, the switch button, the temperature indicator, the connection point of switch button and the circuit connection board A are symmetrically set on both sides of the housing of battery holder.

As a preferred implementation of this invention, the power supply battery is electrically connected with the charging socket and the charging socket end through wires. The circuit connection board B is electrically connected with the switch button, the temperature indicator and the connection point of switch button through wires. The circuit connection board A is electrically connected with the heating plate through wires.

As a preferred implementation of this invention, the cover of milk heater is comprising of the top cover, the anti-slip grooves, side cover and the outer thread. The outer thread and the inner thread are intermeshed with each other, and there are several anti-slip grooves, which are evenly distributed around the top surface of the top cover.

As a preferred implementation of this invention, the milk holder comprises the housing of milk holder, inner thread, fixing box and the side fixing blocks. There are several side fixing blocks, which are evenly distributed around the top surface of the housing of milk holder.

As a preferred implementation of this invention, the battery holder includes the housing of battery holder, locking screw post, circuit connection board A, temperature indicator, holder cavity, screw mounting post, circuit connection board A, circuit connection board B, charging socket end, and connection point of switch button.

As a preferred implementation of this invention, the gravity center of the cover of milk heater, milk holder, power supply battery, battery holder, baseboard and heating plate are all located on the same vertical central axis.

Compared with the prior technology, the present invention is advantageous because the portable milk heater can be more convenient to use as a whole, and it is not necessary to heat the milk in the thermostatic cup, which can effectively avoid the heat loss of the thermostatic cup. It could realize continuous heating, improve the overall heating efficiency, and display the temperature by the temperature indicator, which could effectively meet the overall use requirements during use. Secondly, it can be effectively carried in a portable manner during use, all the milk could be heated and kept warm in time, could be used anytime and anywhere, the overall function is more powerful. What's more, the process of hot milk can be cleaner and more sanitary, and the process of sealed heating can be effectively carried out. Therefore, in the whole process of hot milk, the overall heating efficiency can be improved, and the rapid operation of hot milk can be completed.

BRIEF DESCRIPTION OF THE DRAWINGS

Other features, objects and advantages of the present invention could be more apparent through detailed description of non-limiting embodiments with reference to the following drawings.

DETAILED DESCRIPTION OF THE PREFERRED EMBODIMENTS

Figure 1:
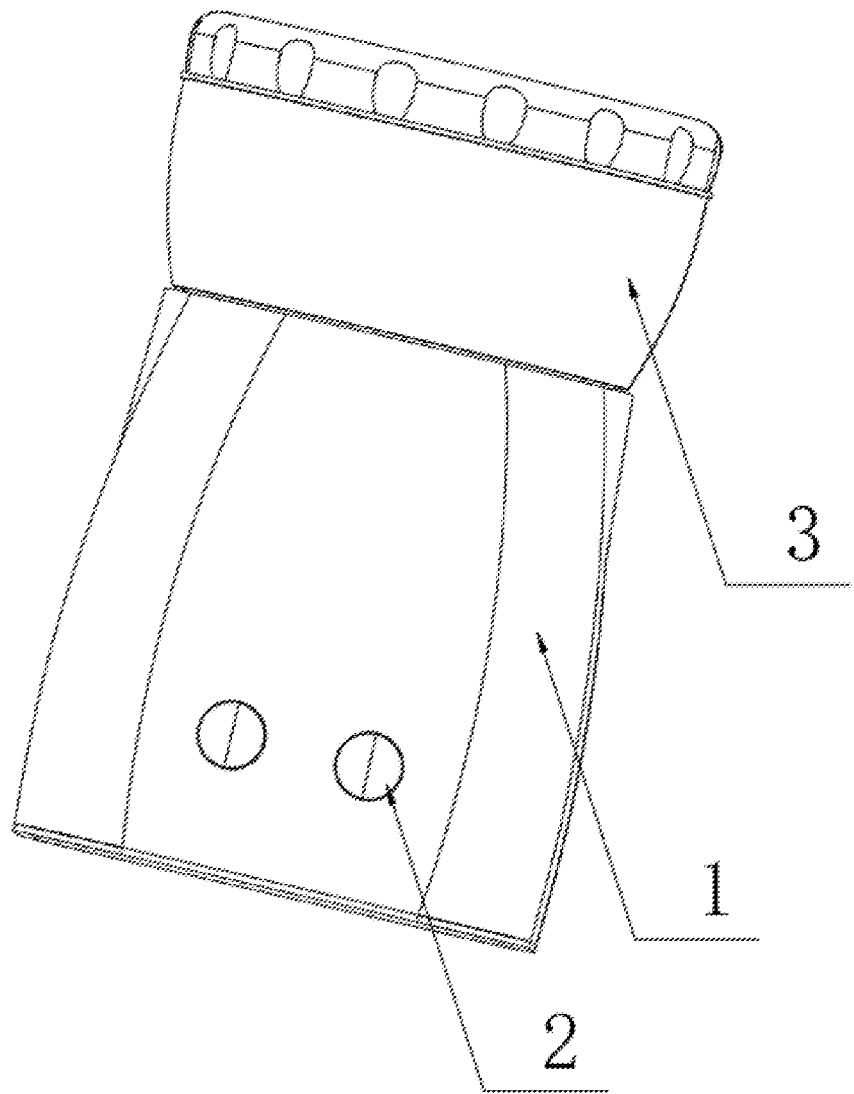
FIG. 1 is the front perspective view of the portable milk heater.
Figure 2:
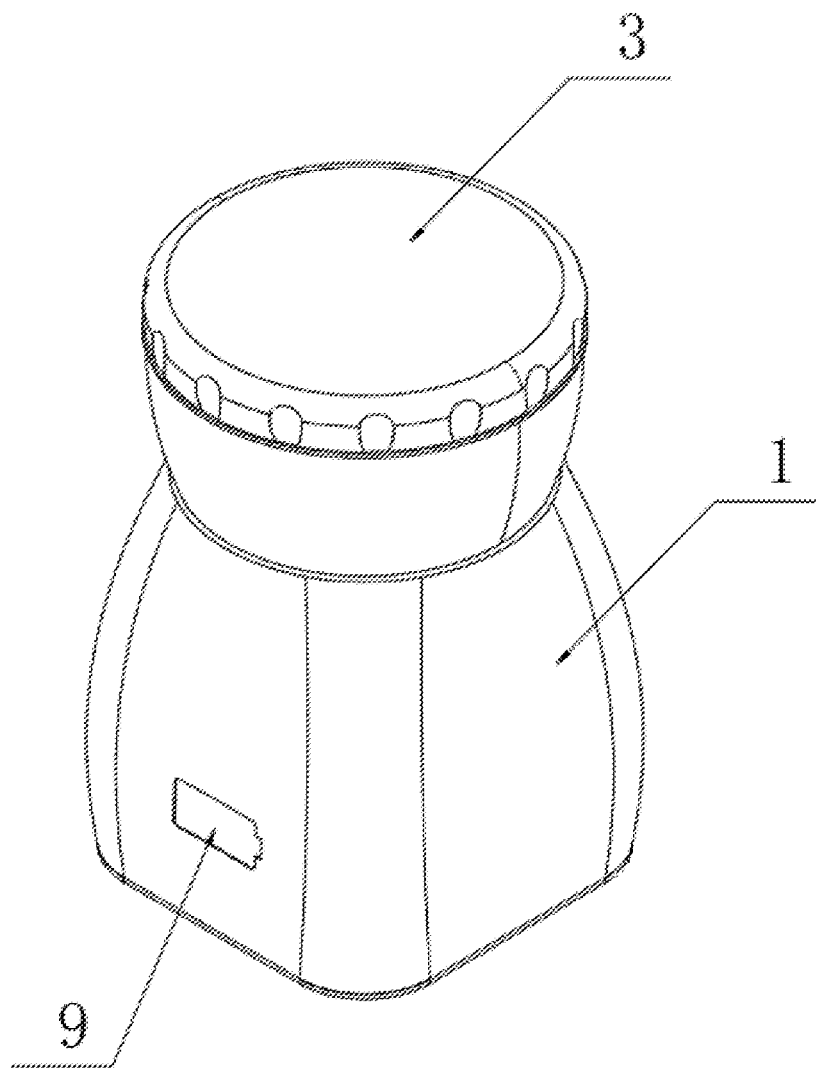
FIG. 2 is the back perspective view of the portable milk heater.
Figure 3:
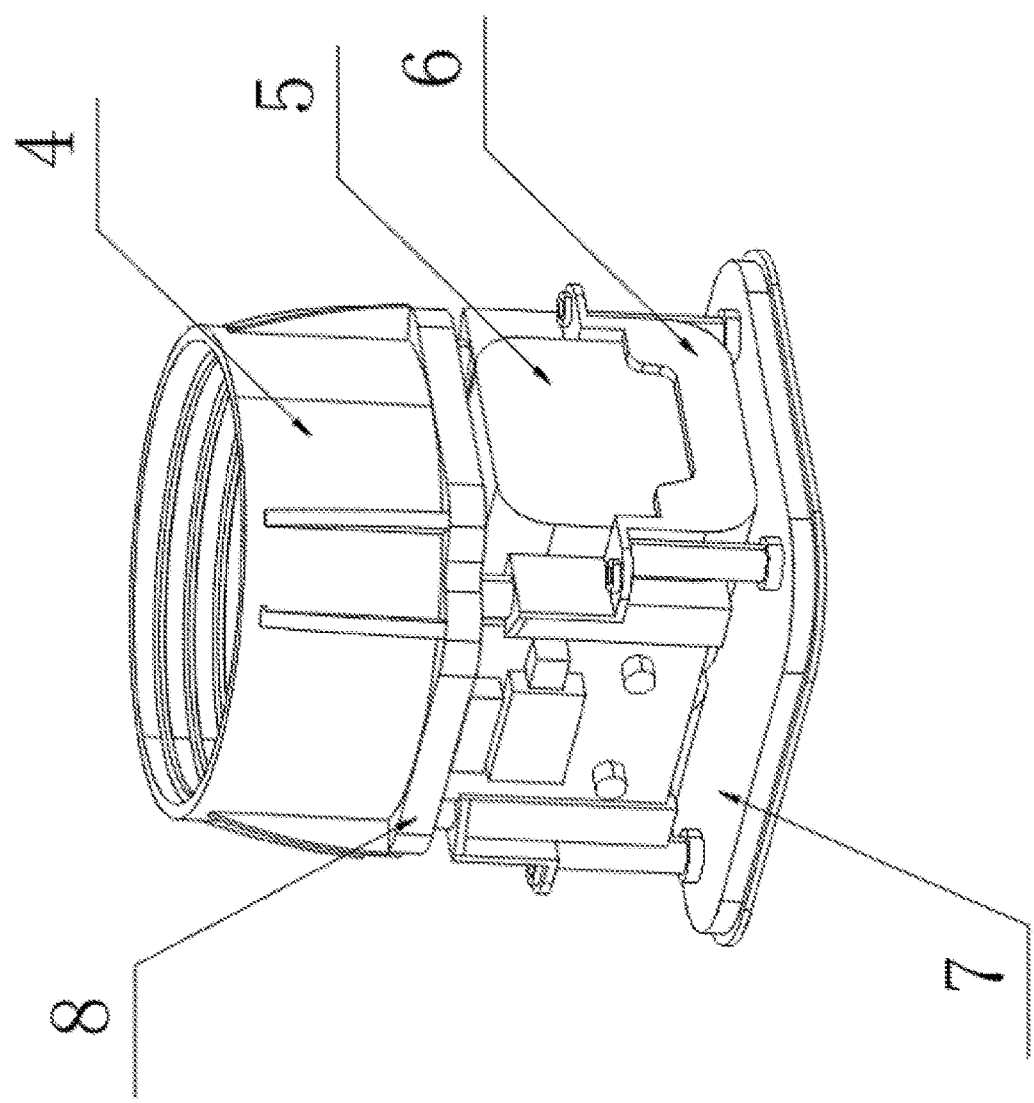
FIG. 3 is the perspective view of the connection part of the milk holder in the portable milk heater.
Figure 4:
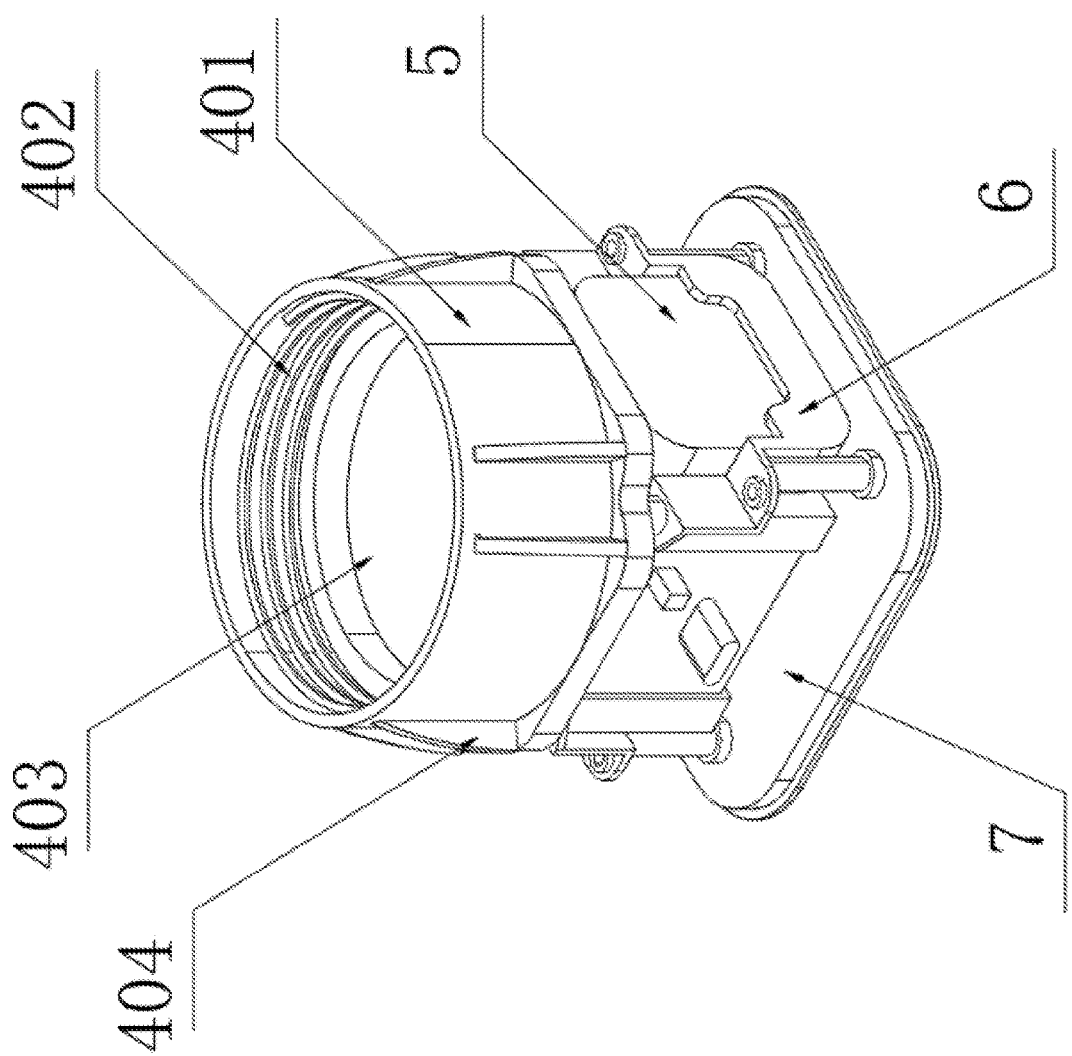
FIG. 4 is the isometric side perspective view of the connection part of the milk holder in the portable milk heater.
Figure 5:
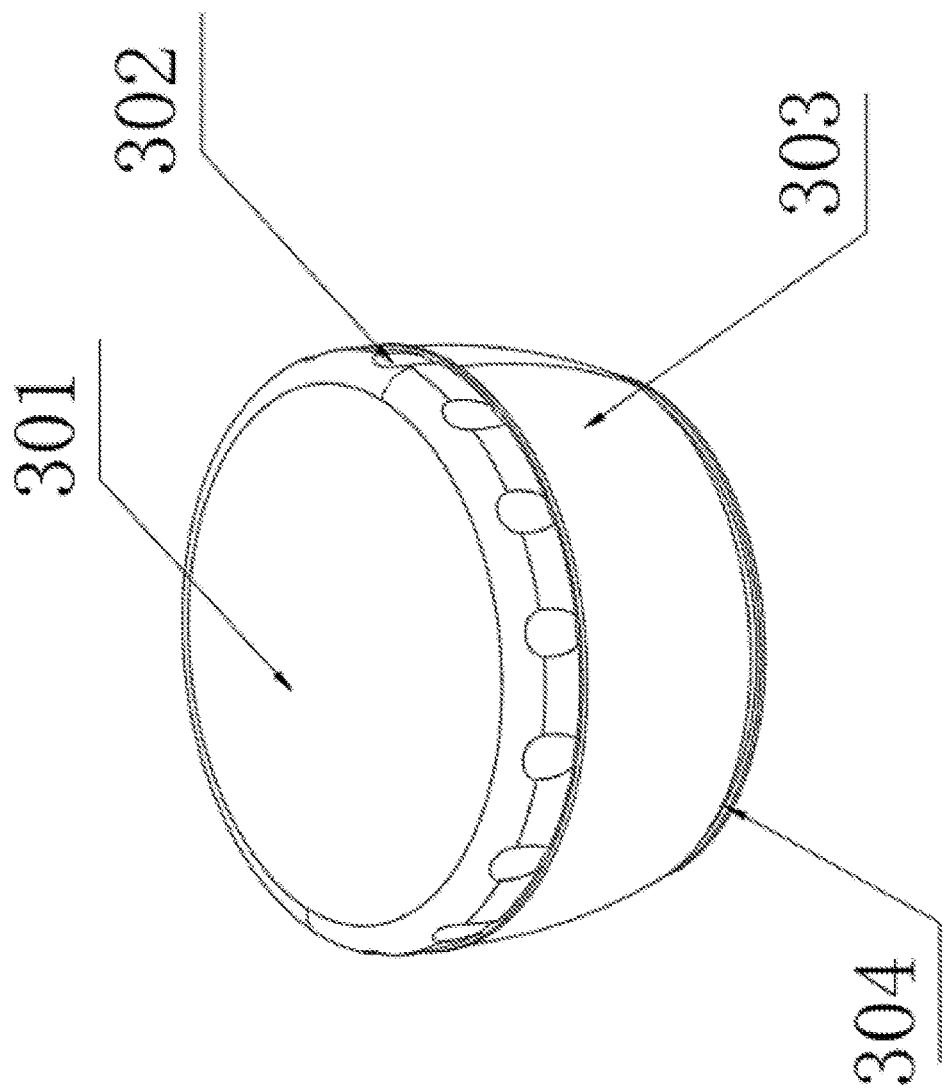
FIG. 5 is the perspective view of the milk heater housing in the portable milk heater.
Figure 6:
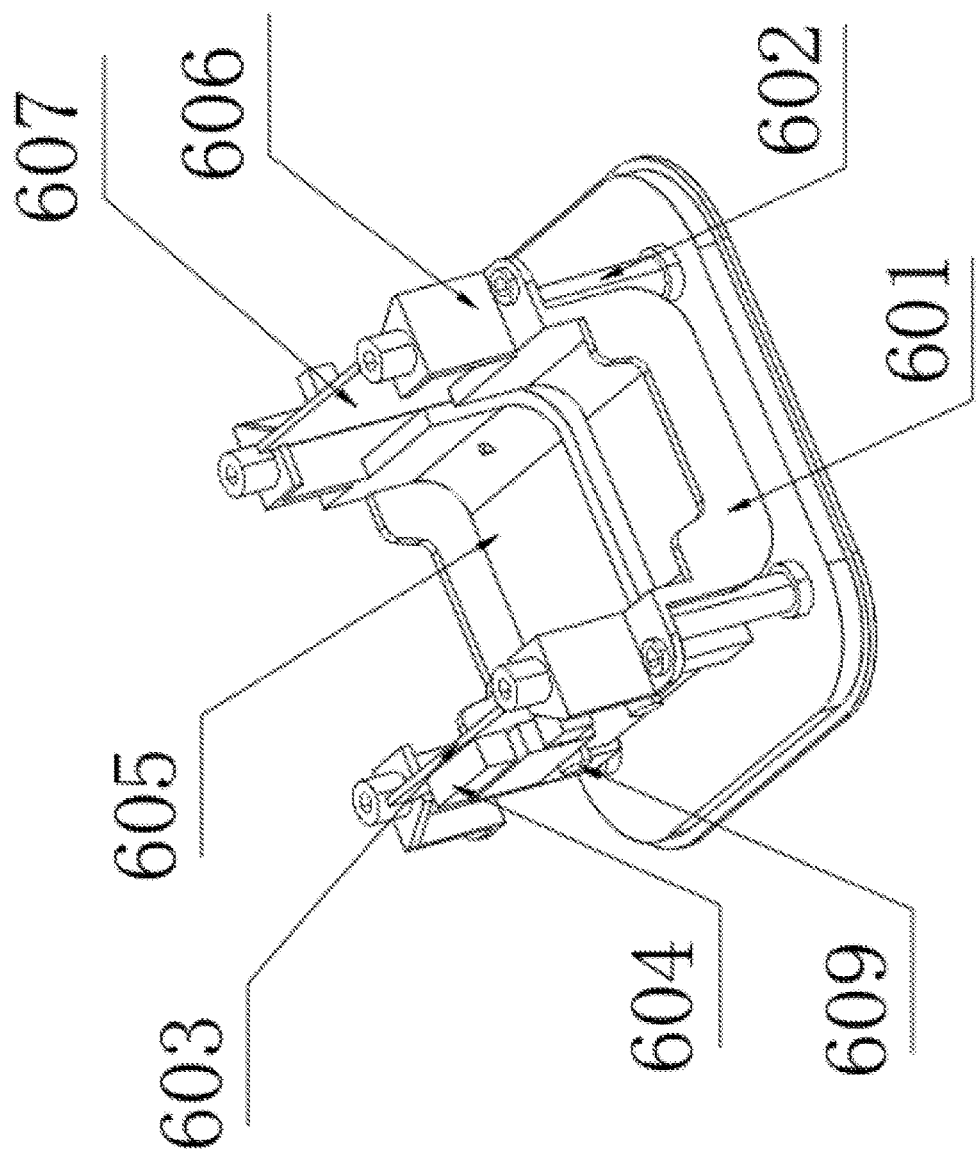
FIG. 6 is the perspective view of the battery holder in the portable milk heater.
Figure 7:
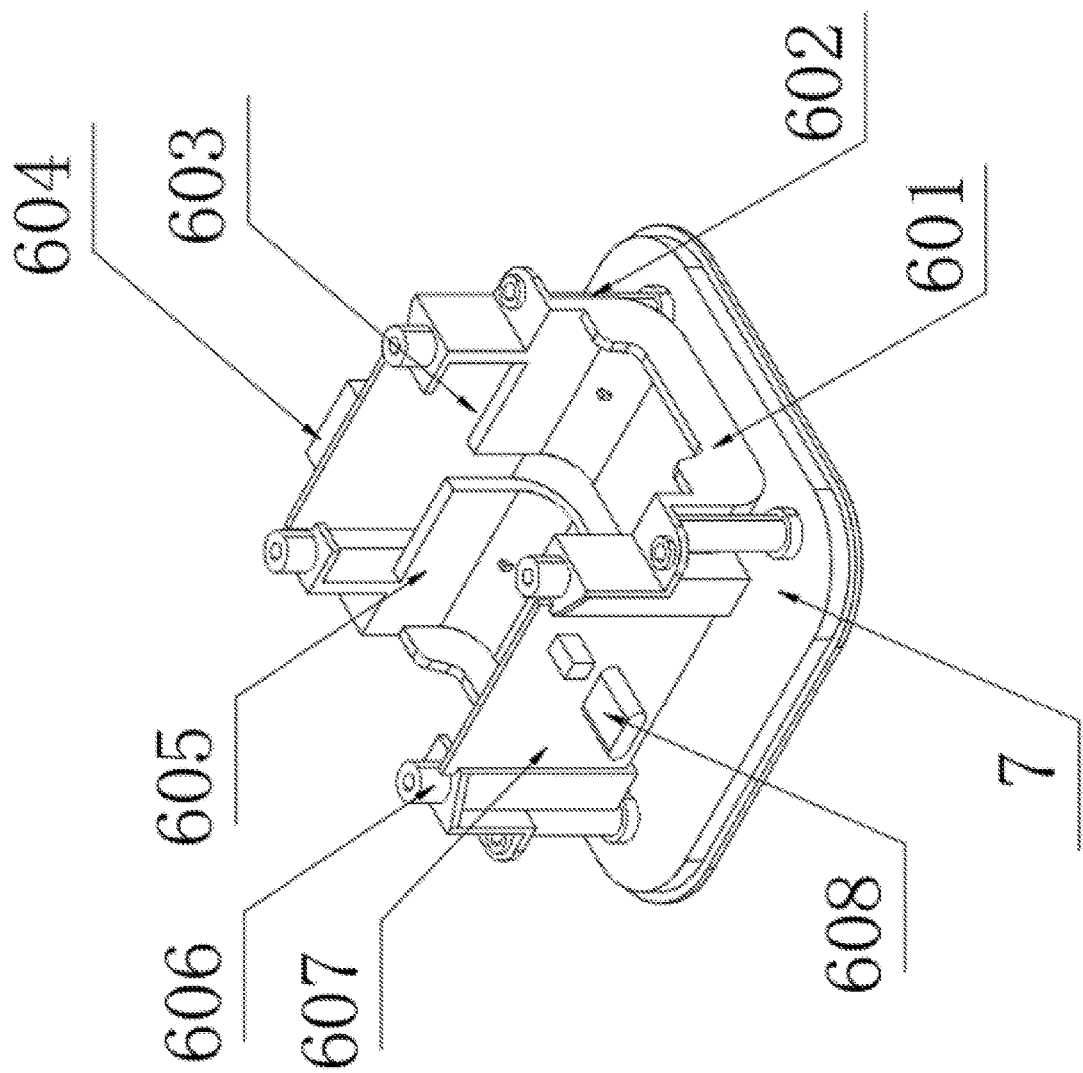
FIG. 7 the isometric side perspective view of the battery holder in the portable milk heater.

As shown in FIG. 1 to FIG. 7, a portable milk heater includes the milk heater housing 1, side cover 303, housing of milk holder 401, housing of battery holder 601 and heating plate 8. The top surface of the milk heater housing 1 is provided with cover of milk heater 3, the front side of the milk heater housing 1 is fixed and connected with switch button 2, the rear side of the milk heater housing 1 is fixed and connected with charging socket 9. It is convenient to use, and it is not necessary to heat the milk in the thermostatic cup, which can effectively avoid the heat loss of the thermostatic cup. It could realize continuous heating and improve the overall heating efficiency. Directly sleeved the milk heater housing 1 and the cover of milk heater 3 together, install the milk holder 4 inside the cover of milk heater 3, and then the anti-slip function can be realized under the action of the anti-slip grooves 302. The cover of milk heater 3 is provided with a milk holder 4, a heating plate 8 is provided between the milk heater housing 1 and the cover of milk heater 3, the bottom surface of the heating plate 8 is fixed and connected with battery holder 6 by screws, the inside of the battery holder 6 is fixed and connected with a baseboard 7 and provided with the power supply battery 5. The top cover 301 is sleeved on the top surface of the side cover 303, the outer wall of the top cover 301 is provided with the anti-slip grooves 302, the inner wall of the side cover 303 is provided with an outer thread 304. The outer wall of the housing of milk holder 401 is provided with the side fixing blocks 404 on the outside wall and the fixing box 403 inside, the inner wall of the housing of milk holder 401 is provided with inner thread 402, the bottom surface of the milk holder 4 is provided with the heating plate 8. The outer wall of the housing of battery holder 601 is provided with the locking screw post 602, the circuit connection board A 603 and the circuit connection board B 607 is arranged on both sides of top surface of housing of battery holder 601, Under the action of the outer thread 304 and the inner thread 402, it is convenient for the fixed installation of the milk holder 4 and the cover of milk heater 3. Place the milk to be heated in the fixing box 403 and heat the milk by the heating plate 8 at the bottom. Then, under the action of the power supply battery 5, the power supply operation can be performed on the charging socket 9, the charging socket end 608 and the circuit connection board B 607, the switch button 2, the temperature indicator 604, the connection point of switch button 609, the circuit connection board A 603 and the heating plate 8, in order to realize the overall circuit connection. The side of the circuit connecting plate A 603 is fixed and connected with a temperature indicator 604 and connection point of switch button 609, the side of the circuit connecting plate B 607 is fixed and connected with charging socket end 608, the top surface of the housing of battery holder 601 is provided with a screw mounting post 606, the connection point of switch button 609 is provided with a holder cavity 605.

As shown in FIG. 1, FIG. 3, FIG. 5 and FIG. 7, the charging socket 9 is electrically connected between the circuit connection board B 607 and the charging socket end 608 through wires, and the switch button 2 is electrically connected between the circuit connection board A 603, the temperature indicator 604 and the connection point of switch button 609 through wires. Two connection point of switch button 609 and circuit connection board A 603 are included respectively. Besides, the charging socket 9, charging socket end 608 and circuit connection board B 607, the switch button 2, the temperature indicator 604, the connection point of switch button 609 and the circuit connection board A 603 are symmetrically set on both sides of the housing of battery holder 601. The whole device can be opened and closed through switch button 2. Under the action of charging socket end 608, the charging operation can be realized, circuit control and connection of circuit connection plate A 603, circuit connection plate B 607 and temperature indicator 604 can be realized. The fixed connection between the baseboard 7, the heating plate 8 and the battery holder 6 could be realized by the screw mounting post 606 and the locking screw post 602. It could be conveniently carried out in a portable manner and could be heated as a whole during outdoor use.

The power supply battery 5, charging socket 9, charging socket end 608, circuit connection board B 607, switch button 2, temperature indicator 604, connection point of switch button 609, circuit connection board A 603 and heating plate 8 are electrically connected through wires. The cover of milk heater 3 is comprising of the top cover 301, the anti-slip grooves 302, side cover 303 and the outer thread 304, the outer thread 304 and the inner thread 402 are intermeshed with each other, and there are several anti-slip grooves 302, which are evenly distributed around the top surface of the top cover 301. The milk holder 4 is comprising of the housing of milk holder 401, inner thread 402, fixing box 403 and the side fixing blocks 404, there are several side fixing blocks 404, which are evenly distributed around the top surface of the housing of milk holder 401. It could effectively meet the overall use requirements during use, all the milk could be heated and kept warm in time, could be used anytime and anywhere, the overall function is more powerful. What's more, the process of milk heating can be cleaner and more sanitary, and the process of sealed heating can be effectively carried out. Therefore, the overall heating efficiency can be improved, and the rapid operation of milk heating can be completed during the whole process. The battery holder 6 includes the housing of battery holder 601, locking screw post 602, circuit connection board A 603, temperature indicator 604, holder cavity 605, screw mounting post 606, circuit connection board B 607, charging socket end 608, and connection point of switch button 609.

The cover of milk heater 3, milk holder 4, power supply battery 5, battery holder 6, baseboard 7 and heating plate 8 are all located on the same vertical central axis.

The present invention is advantageous because it is convenient to use as a whole, and it is not necessary to heat the milk in the thermostatic cup, which can effectively avoid the heat loss of the thermostatic cup. It could realize continuous heating and improve the overall heating efficiency. Directly sleeved the milk heater housing 1 and the cover of milk heater 3 together, install the milk holder 4 inside the cover of milk heater 3, and then the anti-slip function can be realized under the action of the anti-slip grooves 302. Under the action of the outer thread 304 and the inner thread 402, it is convenient for the fixed installation of the milk holder 4 and the cover of milk heater 3. Place the milk to be heated in the fixing box 403 and heat the milk by the heating plate 8 at the bottom. Then, under the action of the power supply battery 5, the power supply operation can be performed on the charging socket 9, the charging socket end 608 and the circuit connection board B 607, the switch button 2, the temperature indicator 604, the connection point of switch button 609, the circuit connection board A 603 and the heating plate 8, in order to realize the overall circuit connection. The whole device can be opened and closed through switch button 2. Under the action of charging socket end 608, the charging operation can be realized, circuit control and connection of circuit connection plate A 603, circuit connection plate B 607 and temperature indicator 604 can be realized. The fixed connection between the baseboard 7, the heating plate 8 and the battery holder 6 could be realized by the screw mounting post 606 and the locking screw post 602, the temperature could be displayed by the temperature indicator 604. It could be conveniently carried out in a portable manner, and could be heated as a whole during outdoor use. It could effectively meet the overall use requirements during use, all the milk could be heated and kept warm in time, could be used anytime and anywhere, the overall function is more powerful. What's more, the process of milk heating can be cleaner and more sanitary, and the process of sealed heating can be effectively carried out. Therefore, the overall heating efficiency can be improved, and the rapid operation of milk heating can be completed during the whole process.

While the description above refers to the particular embodiments of the present invention, it will be understood that many modifications may be made without departing from the spirit thereof. Any equivalent replacement or modification would fall within the protection scope of the present invention.

What is claimed is:

1. A portable milk heater, comprising a milk heater housing (1), side cover (303), a housing of a milk holder (401), a housing of a battery holder (601) and a heating plate (8), wherein a cover (3) is disposed on top of the milk heater housing (1), a switch button (2) is located on a front side of the milk heater housing (1), and a charging socket (9) is located at a back side thereof; the milk holder (4) is disposed in the cover (3);

and the heating plate (8) is disposed between the milk heater housing (1) and the cover (3), a bottom surface of the heating plate (8) is connected with the battery holder (6), a baseboard (7) is located inside of the battery holder (6), and a power supply battery (5) is disposed in the batter holder (6);

wherein a top cover (301) is sleeved on a top surface of a side cover (303), an outer wall of the top cover (301) has a plurality of anti-slip grooves (302), and an inner wall of the side cover (303) has an outer thread (304);

wherein an outer wall of the housing of milk holder (401) is provided with the side fixing blocks (404) and the fixing box (403), the inner wall of the housing of milk holder (401) is provided with inner thread (402), the bottom surface of the milk holder (4) is provided with the heating plate (8);

wherein an outer wall of the housing of battery holder (601) has a locking screw post (602), a first circuit connection board (603) and a second circuit connection board (607) on both top sides of the housing of battery holder (601); a temperature indicator (604) and a connection point of switch button (609) are on the side of the first circuit connecting board (603), and a charging socket end (608) is on the side of the second circuit connecting board (607); a top surface of the housing of battery holder (601) has a screw mounting post (606), and the switch button (609) has a holder cavity (605).

2. The portable milk heater according to claim 1, wherein the charging socket (9) is electrically connected between the second circuit connection board (607) and the charging socket end (608) through wires, and the switch button (2) is electrically connected between the first circuit connection board (603), the temperature indicator (604) and the connection point of switch button (609) through wires.

3. The portable milk heater according to claim 1, further comprising two connection point of switch button (609) and first circuit connection board (603) respectively, wherein the charging socket (9), charging socket end (608) and the second circuit connection board (607), the switch button (2), the temperature indicator (604), the connection point of switch button (609) and the first circuit connection board (603) are symmetrically set on both sides of the housing of battery holder (601).

4. The portable milk heater according to claim 1, wherein the power supply battery (5) is electrically connected with the charging socket (9) and the charging socket end (608) through wires; the second circuit connection board (607) is electrically connected with the switch button (2), the temperature indicator (604), and the connection point of switch button (609) through wires; the first circuit connection board (603) is electrically connected with the heating plate (8) through wires.

5. The portable milk heater according to claim 1, wherein the cover of milk heater (3) is comprising of the top cover (301), the anti-slip grooves (302), side cover (303) and the outer thread (304); the outer thread (304) and the inner thread (402) are intermeshed with each other, and there are several anti-slip grooves (302), which are evenly distributed around the top surface of the top cover (301).

6. The portable milk heater according to claim 1, wherein the milk holder (4) comprises the housing of milk holder (401), inner thread (402), fixing box (403) and the side fixing blocks (404); there are several side fixing blocks (404), which are evenly distributed around the top surface of the housing of milk holder (401).

7. The portable milk heater according to claim 1, wherein the battery holder (6) includes the housing of battery holder (601), the locking screw post (602), the first circuit connection board (603), the temperature indicator (604), the holder cavity (605), the screw mounting post (606), the second circuit connection board (607), the charging socket end (608) and the connection point of switch button (609).

8. The portable milk heater according to claim 1, wherein the cover of milk heater (3), the milk holder (4), the power supply battery (5), the battery holder (6), the baseboard (7) and the heating plate (8) are all located on the same vertical central axis.

* * * * *